United States Patent
Nagoya

(10) Patent No.: US 7,328,273 B2
(45) Date of Patent: Feb. 5, 2008

(54) PROTOCOL DUPLICATING CONFIGURATION AND METHOD FOR REPLICATING AND ORDER OF RECEPTION OF PACKETS ON A FIRST AND SECOND COMPUTERS USING A SHARED MEMORY QUEUE

(75) Inventor: Mitsugu Nagoya, Tokyo (JP)

(73) Assignee: DUAXES Corporation, Tokyo (JP)

( * ) Notice: Subject to any disclaimer, the term of this patent is extended or adjusted under 35 U.S.C. 154(b) by 970 days.

(21) Appl. No.: 10/312,430

(22) PCT Filed: Jan. 31, 2002

(86) PCT No.: PCT/JP02/00770

§ 371 (c)(1),
(2), (4) Date: May 14, 2003

(87) PCT Pub. No.: WO02/078292

PCT Pub. Date: Oct. 3, 2002

(65) Prior Publication Data
US 2004/0017828 A1    Jan. 29, 2004

(30) Foreign Application Priority Data
Mar. 26, 2001  (JP) ............................. 2001-134665

(51) Int. Cl.
*G06F 15/16*    (2006.01)
*G06F 15/167*   (2006.01)
*H04L 12/28*    (2006.01)

(52) U.S. Cl. ...................... 709/232; 709/214; 709/217; 370/390

(58) Field of Classification Search ........ 709/213–219, 709/232; 370/390, 395.72, 412, 428
See application file for complete search history.

(56) References Cited

U.S. PATENT DOCUMENTS 5,819,020 A * 10/1998 Beeler, Jr. ...................... 714/5

(Continued)

FOREIGN PATENT DOCUMENTS

JP    5-327771    12/1993

(Continued)

OTHER PUBLICATIONS

Patent Abstracts of Japan, publication No. 06-259274, publication dated Sep. 16, 1994.

(Continued)

*Primary Examiner*—Joseph E. Avellino
(74) *Attorney, Agent, or Firm*—Osha Liang LLP

(57) ABSTRACT

A method of duplicating protocol for making identical the order of reception and contents of packets on the two computers of a duplicated computer system with respect to packets of specific types of communication. On the first computer, each packet taken in is checked to determine whether the packet is a packet of the specific types of communication before protocol processing. If the packet is a packet of the specific types of communication, the packet is passed to the protocol processing process and added to a virtual queue created in its shared memory. On the second computer, if the packet is a packet of the specific types of communication, the packet is discarded, and the one at the head of the virtual queue in its shared memory is passed to the protocol processing process.

4 Claims, 2 Drawing Sheets

U.S. PATENT DOCUMENTS

| | | | |
|---|---|---|---|
| 6,219,728 B1* | 4/2001 | Yin | 370/412 |
| 6,571,278 B1* | 5/2003 | Negishi et al. | 709/213 |
| 6,920,146 B1* | 7/2005 | Johnson et al. | 370/415 |
| 6,941,396 B1* | 9/2005 | Thorpe et al. | 710/74 |
| 7,006,448 B1* | 2/2006 | Thio | 370/252 |
| 2002/0080720 A1* | 6/2002 | Pegrum et al. | 370/236 |

FOREIGN PATENT DOCUMENTS

| | | |
|---|---|---|
| JP | 6-259274 | 9/1994 |
| JP | 7-64812 | 3/1995 |

OTHER PUBLICATIONS

Patent Abstracts of Japan, publication No. 05-327771, publication dated Dec. 10, 1993.

Patent Abstracts of Japan, publication No. 07-064812, publication dated Mar. 10, 1995.

* cited by examiner

PROTOCOL DUPLICATING CONFIGURATION AND METHOD FOR REPLICATING AND ORDER OF RECEPTION OF PACKETS ON A FIRST AND SECOND COMPUTERS USING A SHARED MEMORY QUEUE

CROSS-REFERENCE TO RELATED APPLICATIONS

This application is a national phase application of PCT Application No. PCT/JP02/00770 filed Jan. 31, 2002, which claims priority from Japanese Application No. 2001-134665 filed Mar. 26, 2001.

FIELD OF THE INVENTION

The present invention generally relates to a duplicated computer system, and in particular to the technology for duplicating protocol on a duplicated computer system.

BACKGROUND

There are various conventional methods of constructing a duplicated computer system using two computers each connected to a network. In such architectures, however, the order of reception of packets which are sent from the same sender and received by the two computers are not always the same. Although no problem occurs in uses for which the order of reception of packets does not matter if an switchover between the computers occurs in case of failure, it is not enough just to duplicate the hardware for uses in which the order of reception of packets does matter.

The present invention was made to solve this problem. The object of the present invention is to provide a method of duplicating protocol so that the order of reception of packets and the contents of them on the two computers of a duplicated computer system are made identical for packets of specified communication, and a duplicated computer system with protocols duplicated by the method.

SUMMARY OF INVENTION

According to one aspect of one or more embodiments of the present invention, a protocol duplicating configuration is described for making identical an order of reception and contents of packets on first and second computers which are connected to a network, having shared memories forming a same address space, and make up a duplicated computer system for packets of specified communications, characterized by having on each of the first and second computers: queue storing means for storing packets to be processed in order of being processed; protocol processing means that is executed in response to reception of packets from the network; temporary queue holding means for temporarily storing the packets having been processed by the protocol processing means in a queue; and virtual queue storing means for storing packets of target communication for the protocol duplication in a queue; wherein the protocol processing means has packet taking-in means which takes in packets one by one from the queue storing means and determines whether each packet taken in is a packet of target communication for the protocol duplication, communication processing means for performing protocol processing on the packet, and packet output means for outputting the packet having been processed by the protocol processing means to the temporary queue storing means; and wherein the protocol processing means on the second computer takes in the packets stored in the queue storing means on the second computer one by one by means of the packet taking-in means and determines whether each packet taken in is a packet of target communication for the protocol duplication, and if the packet is a target packet, discards the packet and passes the packet at the head of the queue in the virtual queue storing means on the second computer to the communication processing means.

According to one aspect of one or more embodiments of the present invention, a protocol duplicating configuration is described for making identical an order of reception and contents of packets on first and second computers which are connected to a network, have shared memories forming a same address space, and make up a duplicated computer system for packets of specified communications, characterized by having on each of the first and second computers: queue storing means for storing packets to be processed in order of being processed; protocol processing means that is executed in response to reception of packets from the network; temporary queue holding means for temporarily storing the packets having been processed by the protocol processing means in a queue; and virtual queue storing means for storing packets of target communication for the protocol duplication in a queue; wherein the protocol processing means has packet taking-in means which takes in packets one by one from the queue storing means and determines whether each packet taken in is a packet of target communication for the protocol duplication, communication processing means for performing protocol processing on the packet, and packet output means for outputting the packet having been processed by the protocol processing means to the temporary queue storing means; and wherein the protocol processing means on the second computer takes in the packets stored in the queue storing means on the second computer one by one by means of the packet taking-in means and determines whether each packet taken in is a packet of target communication for the protocol duplication, and if the packet is a target packet, compares the packet with the packet at the head of the queue in the virtual queue storing means on the second computer, and only if both packets are identical, discards the packet taken in and passes the packet at the head of the queue in the virtual queue storing means on the second computer to the communication processing means.

According to one aspect of one or more embodiments of the present invention, a method of duplicating protocol is described for making identical the order of reception and contents of packets on first and second computers which are connected to a network, have shared memories forming the same address space and make up a duplicated computer system for packets of specified communication, characterized by comprising steps executed on each computer; storing packets received from said network in a queue in order of being processed; executing protocol processing in response to the reception of packets from the network; temporally storing packets having been subjected to the protocol processing in a temporary queue; and storing packets of target communication for the protocol duplication in a virtual queue; wherein the protocol processing step comprises: packet taking-in step which takes in packets one by one from the queue stored by the step of storing received packets in a queue and checks each packet taken in to determine whether the packet is a target packet for duplication; communication processing step which performs the protocol processing on the packet; and packet outputting step which outputs the packet from the communication processing step to the step
} of temporarily storing processed packets in a queue; and takes in packets one by one from the queue stored by the step of storing received packets in a queue on the first computer and checks each packet to determine whether the packet is a target packet for duplication by the packet taking-in step on the first computer, and if the packet is a target packet, performing the protocol processing on the packet by the communication processing step and in addition storing the packet in the virtual queue on the first computer by the step of storing target packets in a virtual queue on the first computer.

The invention of claim 9 is characterized by takeing in the packets stored in the queue in order and checks each packet taken in to determine whether the packet is a packet of the specific types of communication by the packet taken-in step on the second computer, and if the packet is a packet of the specific types of communication, discarding the packet and passing the packet at the head of the virtual queue to the communication processing step. According to one aspect of one or more embodiments of the present invention, a method of duplicating protocol is described for making identical the order of reception and contents of packets on first and second computeers which are connected to a network, have shared memories formin the same address space and make up a duplicated computer system for packets of specified communication, characterized by comprising steps exectued on each computer: storing packets received from said network in a queue in order of being processed; executing protocol processing in response to the reception of packets from the network; temporally storing packets having been subjected to the protocol processing in a temporary queue; and storing packets of target communication for the protocol duplication in a virtual queue; wherein the protocol processing step comprises: packet taking-in step which takes in packets one by one from the queue stored by the step of storing received packets in a queue and checks each packet taken in to determine whether the packet is a target packet for duplication; communication processing step which performs the protocol processing on the packet; and packet outputting step which outputs the packet from the communication processing step to the step of temporarily storing processed packets in a queue; and on the second computer, taking in packets one by one from the queue stored by the step of storing received packets in a queue on the second computer and checking each packet taken in to determine whether the packet is a target packet for duplication by the packet taking-in step on the second computer, and if the packet is a target packet, discarding the packet taken in and passing the packet at the head of the virtual queue on the second computer to the communication processing step.

DESCRIPTION OF THE INVENTION

Figure 1:
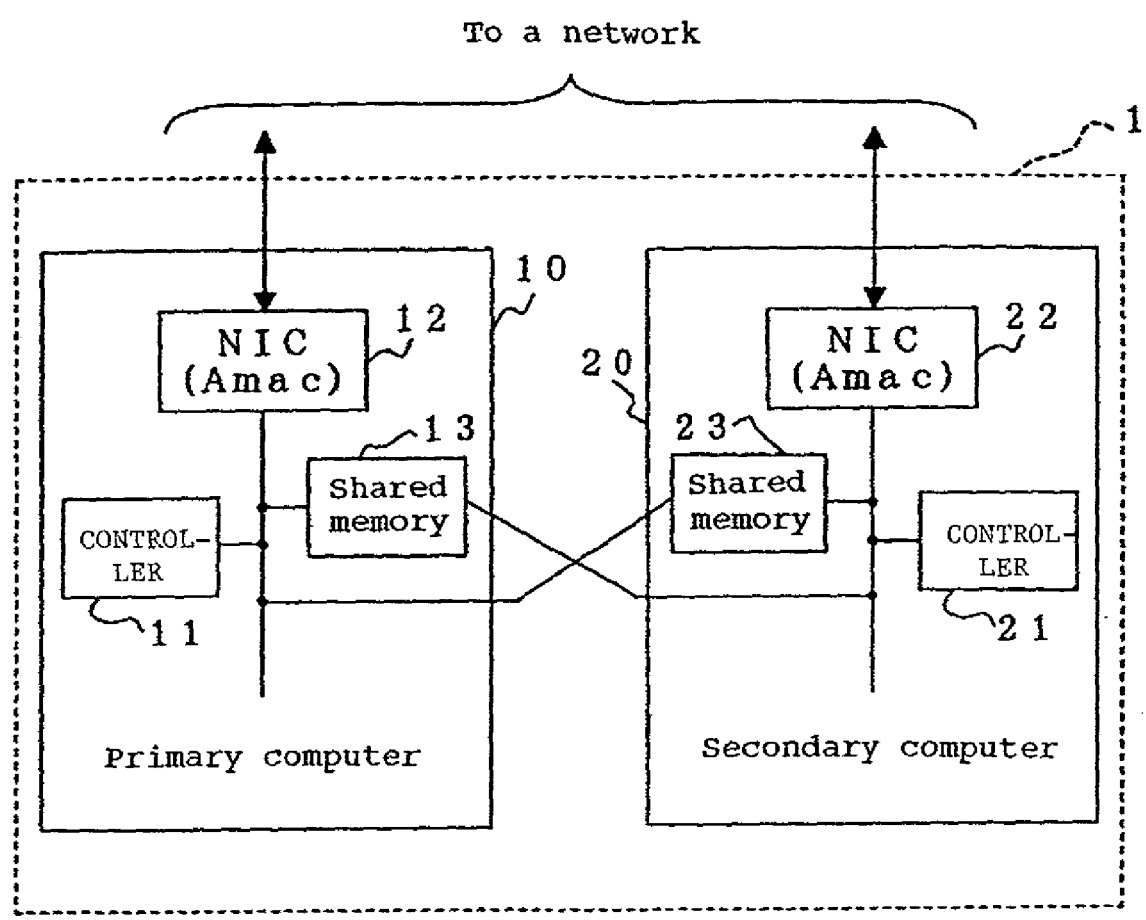
FIG. 1 is a schematic block diagram that shows only the part necessary for explanation of a duplicated computer system to which the method of duplicating protocol according to the present invention is applied.

FIG. 1 is a schematic block diagram that shows only the part necessary for explanation of a duplicated computer system to which the method of duplicating protocol according to the present invention can be applied. In FIG. 1, a duplicated computer system 1 consists of two computers 10 and 20 that are connected to a network.

The computers 10 and 20 may have the same configuration or different configurations depending on the purpose of use. Since the necessary components are common to both computers 10 and 20, they are assigned corresponding reference numerals. Each of the computers 10 and 20 may be any type of computer as long as it has a controller 11, 21 including a CPU (Central Processing Unit) and a memory (not shown in the Figure), NIC (Network Interface Card) 12, 22 serving as the interface to the network, shared memory 13, 23 used for communication between the computers 10 and 20.

The NICs 12 and 22 are assigned the same MAC (Media Access Control) address Amac so that the computers 10 and 20 appear as the same computer to the network. The shared memories 13 and 23 are dual-port RAMs (Random Access Memories), which are used to make possible the inter-computer communication between the computers 10 and 20 of the order of reception and contents of packets of target communication to which the protocol duplication of the present invention is applied, and have the same addresses assigned to form the same address spaces (referred to as shared memory spaces) on the individual computers. The shared memories 13 and 23 are configured so that, when either the computer 10 or 20 writes data to its own shared memory space, the same data is written to both shared memories 13 and 23 substantially at the same time.

Next, the operation of the duplicated computer system 1 is described below. The duplication of protocol according to the present invention is to forcibly make the order of reception and contents of packets on one computer identical to those on the other computer. For convenience sake, the case where the order in which packets are subjected to protocol processing on the computer 20 is made equal to that on the computer 10 is described below. The computer 10 is therefore referred to as the primary computer, and the computer 20 as the secondary computer.

Figure 2:
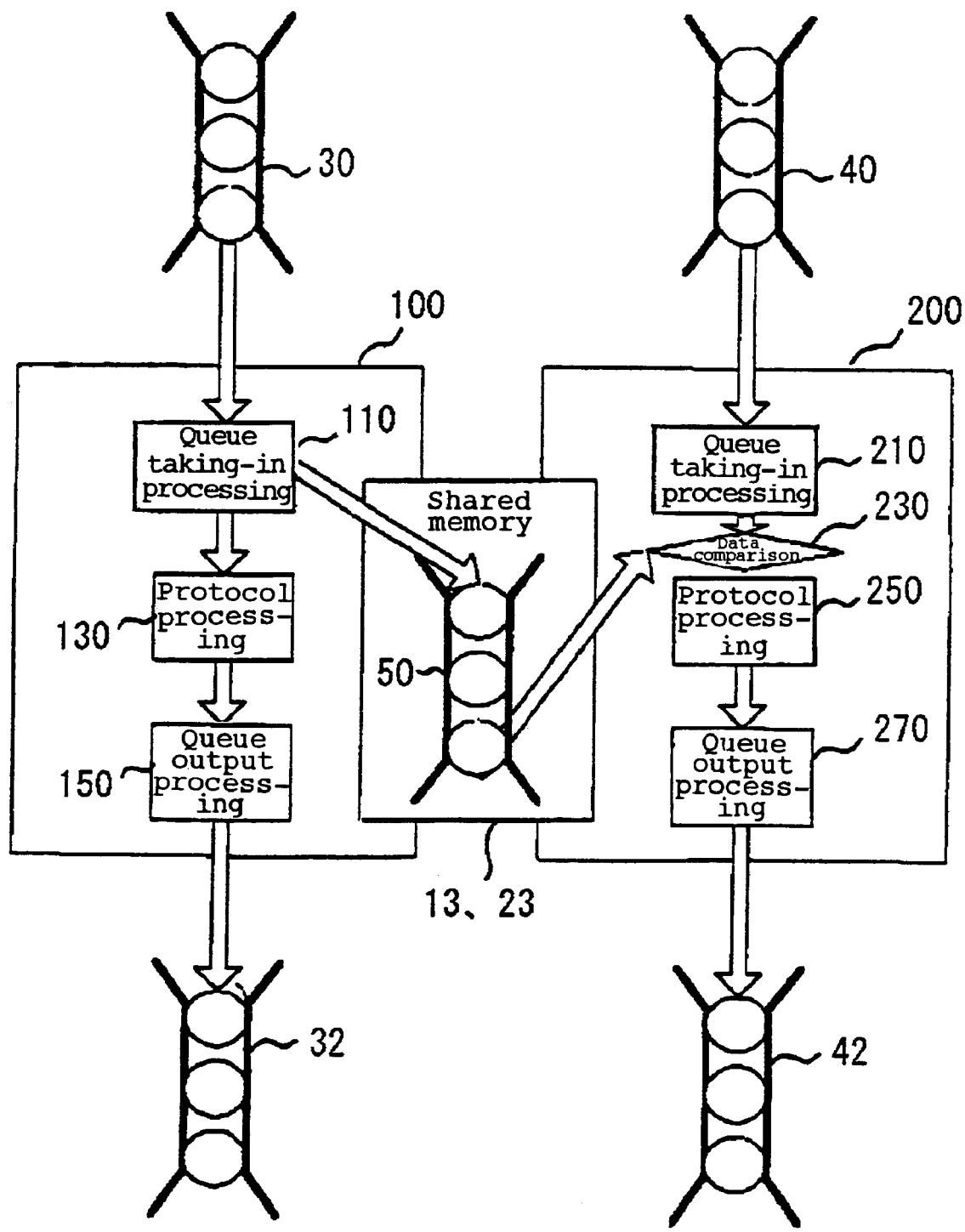
FIG. 2 is a diagram illustrating the principle of the method of duplicating protocol according to the present invention.

FIG. 2 is a diagram illustrating the principle of the duplication of protocol according to the present invention. In FIG. 2, boxes 100 and 200 show the protocol processing performed on the computers 10 and 20 in response to the reception of packets from the network, for example. The protocol may be any one suitable for the use of the computer system 1, for example TCP (Transfer Control Protocol), but is a standard protocol with part of it modified as described later in detail. Assigned reference numbers 30 and 40 are queues in which packets to be subjected to the protocol processing 100 and 200 are stored in order of being processed. Assigned reference numbers 32 and 42 are queues in which packets having undergone the protocol processing 100 and 200 are temporarily stored. Another queue 50 (referred to as a virtual queue) for storing only packets of target communication to which the protocol duplication according to the present invention is applied is generated in each of the shared memories 13 and 23. Since storage into the shared memories 13 and 23 are performed so that the contents in them are always identical as described above, only one of the shared memories 13 and 23 is shown in FIG. 2.

In actual operation, first by the Q (used to stand for a queue) taking-in processing 110 of the protocol processing 100 on the primary server 10, a packet is taken in from the queue 30 and checked to determine whether it is a packet (referred to as a target packet) used in specified communication (target communications) to which the duplication of protocol according to the present invention is applied. Suppose that the duplicated computer system 1 receives packets from a network using TCP for the protocol, for example. In that case, it is possible to determine whether a packet taken in is a target packet using the source MAC address, source IP address, or source port address contained in the packet, for example.

Further, the information (filtering information) used to determine whether a packet taken in is a target packet is not limited to the above-mentioned source MAC address, source IP address, or source port address, and the decision can be made using any information that is contained in packets and can be used to identify packets. Moreover, since it is anticipated that communication that must be subjected to the protocol duplication of the present invention is limited according to the purpose of use of system 1, it is preferable that the manufacturer, vendor, system administrator or the like of the duplicated computer system 1 write beforehand the information used as the decision criteria to identify target communication or packets in a predetermined nonvolatile storage location of each computer as much as it may be needed.

In the Q taking-in processing 110 on the computer 10, whether a packet taken in is a target packet is determined using the filtering information. If the packet taken in is not a target packet, it is simply passed to protocol processing 130 in the ordinary manner. If the packet is a target packet, it is passed to the protocol processing 130 and also added to the virtual queue 50 in the shared memory 13. By this operation, only target packets, which have been subjected to the protocol processing 130 on the computer 10, are stored in the virtual queue 50.

On the other hand, also in the Q taking-in processing 210 on the computer 20, a packet is taken in from the queue 40 and the packet taken in is checked to determine whether it is a target packet, in the same manner as in the Q taking-in processing 110. If the packet taken in is not a target packet, it is simply passed to the protocol processing 250. If the packet taken in is a target packet, either of the following two methods may be employed: (1) Discarding the target packet taken in and passing the packet at the head of the virtual queue 50 to the protocol processing 250 or (2) Comparing the target packet taken in with the one at the head of the virtual queue 50 (230) and, only if they are identical, discarding the target packet taken in and passing the one at the head of the virtual queue 50 to the protocol processing 250.

By the processing described above, it is made possible for packets to pass through the queues 32 and 42 in the same order with respect to target packets.

The present invention therefore can provide a method of duplicating protocol so that the order of reception and the contents of packets on the two computers of a duplicated computer system are made identical for packets of specified communications, and a duplicated computer system with protocols duplicated in this manner.

The invention claimed is:

1. A protocol duplicating configuration for making identical an order of reception and contents of packets on first and second computers which are connected to a network, have shared memories forming a same address space, and make up a duplicated computer system for rackets of specified communications, characterized by having on each of the first and second computers:
   queue storing means for storing packets to be processed in order of being processed;
   protocol processing means that is executed in response to reception of packets from the network;
   temporary queue holding means for temporarily storing the packets having been processed by the protocol processing means in a queue; and
   virtual queue storing means for storing packets of target communication for the protocol duplication in a queue;
   wherein the protocol processing means has packet taking-in means which takes in packets one by one from the queue storing means and determines whether each packet taken in is a packet of target communication for the protocol duplication, communication processing means for performing protocol processing on the packet, and packet output means for outputting the packet having been processed by the protocol processing means to the temporary queue storing means; and
   wherein the protocol processing means on the second computer takes in the packets stored in the queue storing means on the second computer one by one by means of the packet taking-in means and determines whether each packet taken in is a packet of target communication for the protocol duplication, and if the packet is a target packet, discards the packet and passes the packet at the head of the queue in the virtual queue storing means on the second computer to the communication processing means.

2. A protocol duplicating configuration for making identical an order of reception and contents of packets on first and second computers which are connected to a network, have shared memories forming a same address space and make up a duplicated computer system for packets of specified communications, characterized by having on each of the first and second computers:
   queue storing means for storing packets to be processed in order of being processed;
   protocol processing means that is executed in response to reception of packets from the network;
   temporary queue holding means for temporarily storing the packets having been processed by the protocol processing means in a queue; and
   virtual queue storing means for storing packets of target communication for the protocol duplication in a queue;
   wherein the protocol processing means has packet taking-in means which takes in packets one by one from the queue storing means and determines whether each packet taken in is a packet of target communication for the protocol duplication, communication processing means for performing protocol processing on the packet, and packet output means for outputting the packet having been processed by the protocol processing means to the temporary queue storing means; and
   wherein the protocol processing means on the second computer takes in the packets stored in the queue storing means on the second computer one by one by means of the packet taking-in means and determines whether each packet taken in is a packet of target communication for the protocol duplication, and if the packet is a target packet, compares the packet with the packet at the head of the queue in the virtual queue storing means on the second computer, and only if both packets are identical, discards the packet taken in and passes the packet at the head of the queue in the virtual queue storing means on the second computer to the communication processing means.

3. A method of duplicating protocol for making identical the order of reception and contents of packets on first and second computers which are connected to a network, have shared memories forming the same address space and make up a duplicated computer system for packets of specified communication, characterized by comprising steps executed on each computer:

storing packets received from said network in a queue in order of being processed;

executing protocol processing in response to the reception of packets from the network;

temporally storing packets having been subjected to the protocol processing in a temporary queue; and storing packets of target communication for the protocol duplication in a virtual queue;

wherein the protocol processing step comprises:

packet taking-in step which takes in packets one by one from the queue stored by the step of storing received packets in a queue and checks each packet taken in to determine whether the packet is a target packet for duplication;

communication processing step which performs the protocol processing on the packet; and packet outputting step which outputs the packet from the communication processing step to the step of temporarily storing processed packets in a queue; and takes in packets one by one from the queue stored by the step of storing received packets in a queue on the first computer and checks each packet to determine whether the packet is a target packet for duplication by the packet taking-in step on the first computer, and if the packet is a target packet, performing the protocol processing on the packet by the communication processing step and in addition storing the packet in the virtual queue on the first computer by the step of storing target packets in a virtual queue on the first computer.

4. A method of duplicating protocol for making identical the order of reception and contents of packets on first and second computers which are connected to a network, have shared memories forming the same address space and make up a duplicated computer system for packets of specified communication, characterized by comprising steps executed on each computer:

storing packets received from said network in a queue in order of being processed;

executing protocol processing in response to the reception of packets from the network;

temporally storing packets having been subjected to the protocol processing in a temporary queue; and storing packets of target communication for the protocol duplication in a virtual queue;

wherein the protocol processing step comprises:

packet taking-in step which takes in packets one by one from the queue stored by the step of storing received packets in a queue and checks each packet taken in to determine whether the packet is a target packet for duplication;

communication processing step which performs the protocol processing on the packet; and packet outputting step which outputs the packet from the communication processing step to the step of temporarily storing processed packets in a queue; and on the second computer, taking in packets one by one from the queue stored by the step of storing received packets in a queue on the second computer and checking each packet taken in to determine whether the packet is a target packet for duplication by the packet taking-in step on the second computer, and if the packet is a target packet, discarding the packet taken in and passing the packet at the head of the virtual queue on the second computer to the communication processing step.

\* \* \* \* \*